United States Patent
Martin et al.

(10) Patent No.: US 9,671,303 B2
(45) Date of Patent: Jun. 6, 2017

(54) METHOD AND SYSTEM FOR LASER PRESSURE TRANSDUCER

(71) Applicant: Ford Global Technologies, LLC, Dearborn, MI (US)

(72) Inventors: Douglas Raymond Martin, Canton, MI (US); Kenneth James Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 14/643,771

(22) Filed: Mar. 10, 2015

(65) Prior Publication Data

US 2016/0265452 A1 Sep. 15, 2016

(51) Int. Cl.

| F02M 7/28 | (2006.01) |
|---|---|
| G01L 23/24 | (2006.01) |
| F02M 35/104 | (2006.01) |
| F01N 13/10 | (2010.01) |
| F02D 41/14 | (2006.01) |

(Continued)

(52) U.S. Cl.
CPC ............ *G01L 23/24* (2013.01); *F01N 13/008* (2013.01); *F01N 13/10* (2013.01); *F02D 41/1448* (2013.01); *F02D 41/221* (2013.01); *F02D 41/222* (2013.01); *F02M 35/104* (2013.01); *F01N 2560/08* (2013.01); *F02D 41/145* (2013.01); *F02D 2041/389* (2013.01);

(Continued)

(58) Field of Classification Search
CPC ..... G01L 23/24; G01L 23/16; F02D 41/1448; F02D 41/221; F02D 41/222; F02D 41/145; F02D 41/144; F02D 2041/389; F02D 2200/0406; F02D 2200/1015; F02M 35/104; F01N 13/10; G01M 15/104; G01M 15/106; G01M 15/10; G01M 15/11
USPC ..... 123/406.27, 406.44, 676, 688, 690, 435; 701/111; 73/35.12, 114.02, 114.06, 73/114.09, 114.33, 114.37
See application file for complete search history.

(56) References Cited

U.S. PATENT DOCUMENTS

| 4,207,604 A * | 6/1980 | Bell ..................... G01L 9/0086 |
|---|---|---|
| | | 361/278 |
| 4,325,252 A * | 4/1982 | Miller ................. G01K 17/003 |
| | | 250/338.1 |

(Continued)

FOREIGN PATENT DOCUMENTS

WO 2014093817 A1 6/2014

OTHER PUBLICATIONS

Martin, D. et al. "Method and System for Gas Particulate Filter," U.S. Appl. No. 14/540,307, filed Nov. 13, 2014, 50 pages.
(Continued)

*Primary Examiner* — Hai Huynh
(74) *Attorney, Agent, or Firm* — Julia Voutyras; McCoy Russell LLP (57) ABSTRACT

Methods and systems for provided for accurately estimating an engine intake or exhaust manifold pressure using a laser pressure transducer. Laser circuitry is coupled to a pressure sensitive diaphragm that is mounted to the engine manifold. Manifold pressure is inferred based on a deflection of the diaphragm, as estimated based on a timing between emission of a laser pulse into the diaphragm and detection of a reflected pulse from the diaphragm.

18 Claims, 7 Drawing Sheets

(51) Int. Cl.
*F02D 41/22* (2006.01)
*F01N 13/00* (2010.01)
*F02D 41/38* (2006.01)

(52) U.S. Cl.
CPC ............ *F02D 2200/0406* (2013.01); *F02D 2200/1015* (2013.01); *Y02T 10/40* (2013.01)

(56) References Cited

U.S. PATENT DOCUMENTS

| | | | |
|---|---|---|---|
| 4,388,668 A * | 6/1983 | Bell | G01L 9/0086 |
| | | | 361/283.4 |
| 4,426,673 A * | 1/1984 | Bell | G01L 9/0075 |
| | | | 29/25.41 |
| 4,446,724 A * | 5/1984 | Focht | G01L 23/225 |
| | | | 123/494 |
| 4,620,093 A * | 10/1986 | Barkhoudarian | G01L 9/0077 |
| | | | 250/227.21 |
| 4,751,382 A | 6/1988 | Reifel et al. | |
| 4,858,136 A * | 8/1989 | Tanaka | F02D 41/32 |
| | | | 123/492 |
| 5,168,192 A * | 12/1992 | Kosugi | H01L 41/1132 |
| | | | 310/324 |
| 6,341,526 B1 * | 1/2002 | Castracane | G01L 9/0079 |
| | | | 250/231.19 |
| 6,938,489 B2 | 9/2005 | Esashi et al. | |
| 7,088,829 B1 * | 8/2006 | Schick | B60Q 5/00 |
| | | | 381/61 |
| 7,538,401 B2 | 5/2009 | Eriksen et al. | |
| 8,208,143 B2 | 6/2012 | Goto et al. | |
| 2014/0136085 A1 | 5/2014 | Martin et al. | |
| 2014/0149018 A1 | 5/2014 | Martin et al. | |
| 2014/0149023 A1 | 5/2014 | Martin et al. | |
| 2016/0161368 A1 * | 6/2016 | Willi | G01L 23/06 |
| | | | 123/657 |

OTHER PUBLICATIONS

"OMS LaserPoint LP01 Laser Vibrometer Features", OMS Corp., http://www.omscorporation.com/products/laser-point/, p. 1, accessed Jun. 9, 2015.

\* cited by examiner

METHOD AND SYSTEM FOR LASER PRESSURE TRANSDUCER

FIELD

The present application relates to methods and systems for a laser pressure transducer coupled to an engine manifold for measuring manifold pressures accurately and cost-effectively.

BACKGROUND AND SUMMARY

Engine systems may include one or more pressure transducers at various locations for measuring engine operating parameters such as manifold pressure (MAP), exhaust pressure, boost pressure, barometric pressure, etc. The measured parameters are then used to control engine settings. For example, based on the measured parameters, the settings of various engine actuators may be adjusted, such as the operation of an intake throttle, exhaust catalyst, turbocharger, particulate filter, etc. In addition, the measurements affect engine controls for exhaust emissions and engine fuel economy. Various pressure transducer designs are available including, for example, piezo-resistive-type (PRT) transducers and capacitor-type transducers. However, such transducers may have short lives due to the harsh environment they are located in. This is particularly true in the case of exhaust pressure transducers. For example, capacitor-type and PRT transducers may become degraded due to their circuitry being exposed to corrosive liquids. Since the measurement provided by the transducers significantly affects engine control, such transducers may need frequent replacement to allow for reliable readings.

One example of an exhaust transducer that has an improved performance is provided by Goto et al. in U.S. Pat. No. 8,208,143. Therein, an exhaust sensor uses an optical fiber for irradiating exhaust gas with laser light the light irradiated across the exhaust path. The light, upon transmission through the exhaust gas, is measured by a detector. Based on the light received by the detector, various exhaust gas parameters, such as concentration, temperature, etc., are determined. In still other examples, strain gauge type pressure transducers whose resistance value changes with deformation of the sensor may be used. Therein, the amount of deformation of the sensor is correlated with pressure in the vicinity of the sensor.

However, the inventors herein have recognized potential issues with such approaches. As an example, such transducers may still be susceptible to corrosion from exhaust components. For example, due to the sensor substrate being coupled across a cross-section of the exhaust passage, it may degrade easily due to contact with high temperature exhaust and corrosive exhaust gas components. As a result, even if the laser is functional, the sensor may need to be replaced. Further, having the detector in the exhaust environment makes its view of the light source prone to obstruction by soot. Consequently, there may still be expensive warranty issues. In addition, there may be a possibility of needing to recall an engine component, reducing a customer quality perception of the vehicle manufacturer. As another example, the sensors may be cost-prohibitive. For example, strain gauge transducer assemblies, when assembled into a sealed diaphragm, may involve stringent cleaning of the mounting surface and manual application of the strain gauge to the diaphragm with a bridge adhesive. Then the remaining area may need to be filled with a potting compound. The multiple steps add cost and complexity which may render the sensor too costly.

In one example, some of the above issues may be addressed by a method for an engine, comprising: adjusting engine operation responsive to laser pulses received bouncing off a diaphragm in an engine manifold. In this way, a pressure sensor may be provided within a diaphragm that is deflected by pressure variations in the engine manifold.

As an example, an engine manifold may be configured to include a laser pressure transducer system. The laser pressure transducer system may include a hollow diaphragm that is coupled to the engine manifold. For example, the diaphragm may be molded into an engine intake manifold for estimating an intake manifold pressure. As another example, the diaphragm may be mounted on or stamped onto an exhaust manifold for estimating an exhaust manifold pressure. A diode laser and a laser detector may be mounted to a top of the diaphragm. For example, the laser and detector may be mounted to a housing that holds the diaphragm in the engine manifold. The inner cavity of the diaphragm may be sealed, reducing the need for frequent and stringent cleaning. The laser may be operated to emit laser pulses at a pre-defined frequency into the interior (and towards the bottom) of the diaphragm. The pulses may then reflect off the interior and bounce back towards the top, where they may be detected by the detector. A deformation of the diaphragm may be determined based on a time elapsed between emission of the laser pulse from the laser, and detection of the reflected pulse at the detector. The elapsed duration may be compared to a threshold duration learned during calibration conditions when the diaphragm is known to have no deformation (such as during an engine-off condition). As the elapsed duration decreases relative to the calibrated threshold, the estimated deformation of the diaphragm may increase. Further, the deformation estimate may be adjusted based on a temperature of the diaphragm as determined by a thermal sensor mounted on the diaphragm, alongside the laser and detector. The thermal sensor may estimate the diaphragm temperature based on the sensing of infra-red radiation received from inside the diaphragm. The estimated deformation of the diaphragm may be directly correlated with an amount of manifold pressure experienced by the diaphragm. In some embodiments, alongside the static pressure measurement, the output of the laser may also be used to perform a Doppler shift analysis of the diaphragm's deflection, thereby providing a higher resolution dynamic pressure measurement. One of more engine operating parameters, such as throttle opening and boost pressure, may then be adjusted based on the manifold pressure estimate. By using a laser pressure transducer, each of the static pressure measurement and dynamic pressure measurement may be achieved with the same pressure transducer. As such, Doppler shift analysis of manifold pressure may be outside the capability of conventional strain-gage pressure sensors.

In this way, a more cost-effective manifold pressure transducer/sensor may be provided without compromising the accuracy or reliability of the sensor. By using lasers, detectors, and thermal sensors that are coupled to a sealed diaphragm, the sensor circuitry can be protected from the harsh environment of the engine intake or exhaust manifold, improving sensor durability and reducing warranty issues. By relying on laser components that can be assembled easily (e.g., circuitry that can be assembled with pick and place machines onto a single circuit card), the cost and complexity of assembling a pressure transducer into an engine intake or exhaust manifold can be reduced. By improving the reliability of the pressure measurement, engine control errors may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Methods and systems are provided for a cost-effective and durable laser pressure transducer. The pressure transducer may be coupled to the intake manifold or exhaust manifold of an engine system, as the engine system of FIGS. 1 and 6, for accurately estimating a manifold pressure (e.g., intake or exhaust manifold pressure). The pressure transducer may be configured as a sealed diaphragm mounted with circuity related to each of a laser, detector, and thermal sensor (FIG. 2). The diaphragm may be molded into an intake manifold, as shown at FIG. 3 or stamped onto an exhaust manifold, as shown at FIG. 4. An engine controller may be configured to perform a control routine, such as the routine of FIG. 5, to emit laser pulses from the laser into the diaphragm and then detect a reflected pulse bouncing off the interior of the diaphragm at the detector. Manifold pressure may be correlated with an amount of deformation of the diaphragm, the deformation determined based on a time elapsed between the emission of the laser pulse and detection of the reflected pulse. The controller may also be configured to perform a control routine, such as the routine of FIG. 7, to identify degradation of an engine component (such as a fuel injector or an individual runner particulate filter or a misfire event) based on exhaust manifold pressure estimated by the laser pressure transducer. In this way, manifold pressure may be accurately learned while prolonging the life of the manifold pressure sensor.

Figure 1:
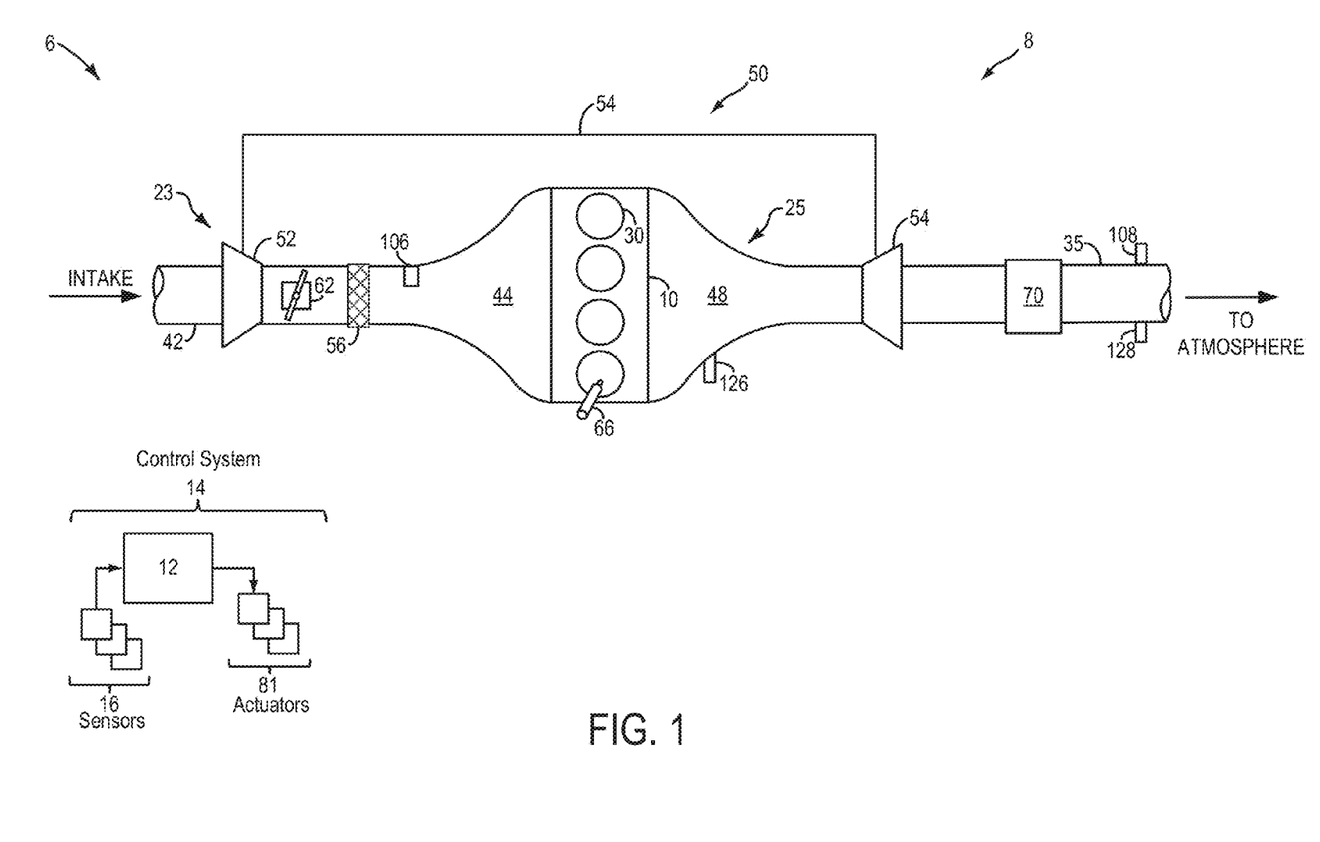
FIG. 1 shows an example internal combustion engine configured with a laser pressure transducer system.
Figure 2:
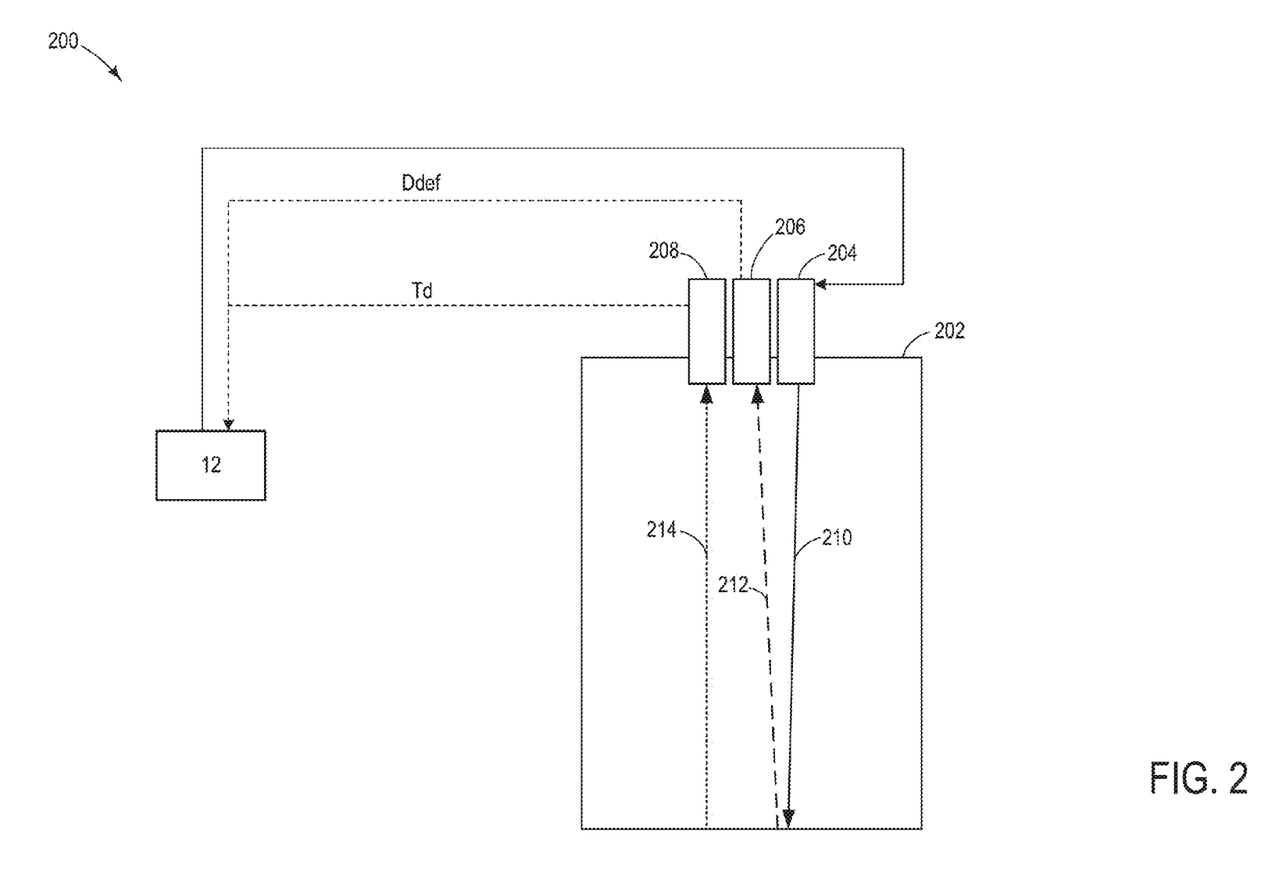
FIG. 2 shows an example embodiment of the laser pressure transducer system of FIG. 1.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere.

In the depicted example, engine system 8 is a boosted engine system configured with a turbocharger 50. Turbocharger 50 includes an intake compressor 52 driven, via shaft 53, by the rotation of an exhaust turbine 54. Throttle 62 may be located in intake passage 42 downstream of intake compressor 52, and upstream of an (optional) after-cooler 56. When included, the after-cooler may be configured to reduce the temperature of intake air compressed by the boosting device.

Intake manifold 44 may include a laser pressure transducer 106 coupled downstream of throttle 62 and after-cooler 56 for estimating an intake manifold pressure (MAP). As elaborated at FIG. 3, pressure transducer 106 may be molded as part of the intake manifold (or tube or plenum). As elaborated at FIG. 2, the laser pressure transducer may include a diaphragm wherein the manifold pressure is estimated based on the deformation of the diaphragm. The diaphragm may be made of the same material as the intake manifold, such as made of glass fiber plastic. This improves the durability of the sensor. An engine controller may adjust one or more engine operating parameters, such as a boost level, a throttle opening, and/or an amount of exhaust gas recirculation, based on the estimated intake manifold pressure.

Engine exhaust 25 may include one or more emission control devices 70, which may be mounted in a close-coupled position in the exhaust. One or more emission control devices may include a three-way catalyst, lean NOx filter, SCR catalyst, etc. Tailpipe exhaust gas that has been treated following passage through emission control device 70 may be expelled to the atmosphere via exhaust passage 35.

Exhaust manifold 48 may also include a laser pressure transducer 108 coupled upstream of emission control device 70 for estimating an exhaust manifold pressure. In an alternate example, laser pressure transducer may be positioned in the exhaust manifold, upstream of turbine 54, in the straight region of the exhaust manifold. Such a location would also enable detection of a blocked or missing emission control device 70. As elaborated at FIG. 4, pressure transducer 108 may be stamped onto exhaust passage 35 (or tube or plenum). As elaborated at FIG. 2, the laser pressure transducer may include a diaphragm wherein the manifold pressure is estimated based on the deformation of the diaphragm. The diaphragm may be made of steel or aluminum. This improves the durability of the sensor in the harsh and corrosive environment of the exhaust manifold. An engine controller may adjust one or more engine operating parameters, such as a boost level, a throttle opening, and/or an exhaust catalyst temperature, based on the estimated exhaust manifold pressure.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), temperature sensor 128, intake manifold pressure transducer 106, and exhaust pressure transducer 108. Other sensors such as additional pressure, temperature, air/fuel ratio, and composition sensors may be coupled to various locations in the vehicle system 6. As another example, the actuators may include fuel injectors 66, throttle 62, boost level output by turbocharger 50, etc. The control system 14 may include a controller 12. The controller may receive input data from the various sensors, process the input data, and trigger the actuators in response to the processed input data based on instruction or code programmed therein corresponding to one or more routines. One example routine is shown with reference to FIG. 5.

Now turning to FIG. 2, an example embodiment 200 of a laser pressure transducer is shown. The laser pressure transducer may be coupled to an intake manifold (such as sensor 106 of FIG. 1) or to an exhaust manifold (such as sensor 108). Transducer 200 includes a diaphragm 202. In one example, where the transducer is coupled to an engine exhaust manifold, diaphragm 202 may be cast into (or stamped into or machined into) the exhaust manifold. In addition, the integrated diaphragm may be made of a material that is resistant to higher temperatures, such as aluminum or steel. In another example, where the transducer is coupled to an engine intake manifold, diaphragm 202 may be molded into the intake manifold, for example molded as a flat spot on the intake manifold. In addition, the integrated diaphragm may be made of the same material as the intake manifold, such as flex (fiber glass plastic). In other examples, the transducer diaphragm may be made of conventional transducer housing with a plastic or metal diaphragm and a sensor line (e.g., a gauge sensor line) may be used.

Each of a diode laser 204 and a laser detector 206 may be mounted to a top of the diaphragm 202 and directed to an interior surface at the bottom of the diaphragm. In addition, a thermal sensor 208 may be mounted to the top of the diaphragm and directed to an interior surface at the bottom of the diaphragm. Alternatively, the optical components may be mounted to a housing that holds the diaphragm in the engine manifold. As such, due to the proliferation of diode laser technology into production products in recent years, the cost of lasers has significantly reduced. In addition, the circuitry associated with diode lasers and detectors can be easily assembled with pick and place machines onto a single circuit card. As a result, diode laser 204, detector 206, and thermal sensor 208 can be easily and cost-effectively coupled to the top of diaphragm 202. As such, this may reduce the cost and complexity of the laser pressure transducer over strain gage assemblies that require stringent cleaning of a mounting surface, manual application of a strain gage to a diaphragm with adhesive, and careful filling of a cavity of the diaphragm with a potting compound.

Diaphragm 202 may be hollow with the cavity being sealed. The outer surface of the diaphragm may be deformable upon application of pressure. Charge in the vicinity of diaphragm 202 (such as in the intake manifold or the exhaust manifold, based on the location of the transducer) may apply a pressure on the diaphragm, thereby deforming it. Specifically, as the manifold pressure increases, the deformation of the diaphragm may increase. Controller 12 may be configured to estimate the deformation of the diaphragm based on laser pulses received bouncing off (the interior of) the diaphragm, and correlate the deformation of the diaphragm with a manifold pressure estimate. One or more engine operating parameters may then be adjusted based on the estimated manifold pressure, as elaborated at FIG. 5.

Controller 12 may be configured to operate laser 204 to emit laser pulses into an interior of the diaphragm. Specifically, laser 204 may emit laser pulse 210 into, and towards a bottom of the diaphragm. Laser pulse 210 may be a lower power pulse. For example, the laser pulse used may sweep frequency at low energy intensity. As an example, the laser may be frequency-modulated with a repetitive linear frequency ramp. Detector 206 located at the top of the diaphragm may receive return pulse 212 reflected from the bottom surface of the diaphragm. Specifically, after laser emission, light energy that is reflected off of the diaphragm is detected by detector 206. By directing the laser and the detector towards the interior of the diaphragm from within the sealed cavity of the diaphragm, both the laser as well as the optics of the laser and detector can be maintained clean. As such, this allows for more accurate measurements to be made while increasing the durability and life of the pressure transducer system.

The difference in time (that is, duration elapsed) between emission of laser pulse 210 and detection of reflected pulse 212 may be used to estimate an amount of deformation of the diaphragm. The time difference may be further compared to a time threshold. For example, because the distance of the laser 204 to the bottom surface of diaphragm 202 is small, detection of a reflected laser pulse by detector 206 may occur in the picosecond time range. A threshold of time that is based on the time taken for a laser pulse to cover the length of a completely not deformed diaphragm and back (for example, 1 picosecond), may therefore be adopted as a reference value for comparison to the measured time difference. The reference value may be learned during selected conditions when the diaphragm is not deformed, such as soon after diaphragm assembly into the manifold, or during an engine off condition. For an emitted laser pulse, if the reflected light energy takes shorter than 1 picosecond to detect, this indicates diaphragm deformation. Thus, as the time taken for the reflected pulse to be detected decreases from the threshold, an estimated diaphragm deformation may be increased. Since the diaphragm deformation is due to pressure applied on the diaphragm from charge in the manifold, manifold pressure (MAP) may be inferred based on the increased diaphragm deformation. In some examples, the diaphragm deformation (and thereby MAP) may be estimated by frequency modulation methods using frequency-modulated laser beams with a repetitive linear frequency ramp.

The pressure estimate may also be adjusted to compensate for changes in diaphragm deformation due to temperature. Specifically, thermal sensor 208 may be configured to estimate a temperature of the diaphragm based on infra-red radiations 214 received at thermal sensor 208 from the interior of diaphragm 202. As elaborated with reference to FIG. 5, a controller may estimate the manifold pressure based on each of the estimated temperature and the estimated diaphragm deflection by referring to a look-up table. If the estimated manifold pressure (MAP) is within a valid range (as based on the length of the diaphragm), the MAP signal may be used to adjust engine operating parameters. Else, the transducer output may be considered faulty and in a degraded accuracy range.

It will be appreciated that in addition to the above-discussed static pressure measurements, higher resolution dynamic pressure measurements may be made by using the same laser pressure transducer but while applying a Doppler shift measurement of the estimated diaphragm deflection/deformation. Therein, by comparing diaphragm deflections at two different times, and observing a Doppler shift between the deflections, a change in MAP can be inferred. For example, the value of two types of measurements may be compared when considering that the MAP must detect if a large static value is approached that may damage the intake.

Figure 3A:
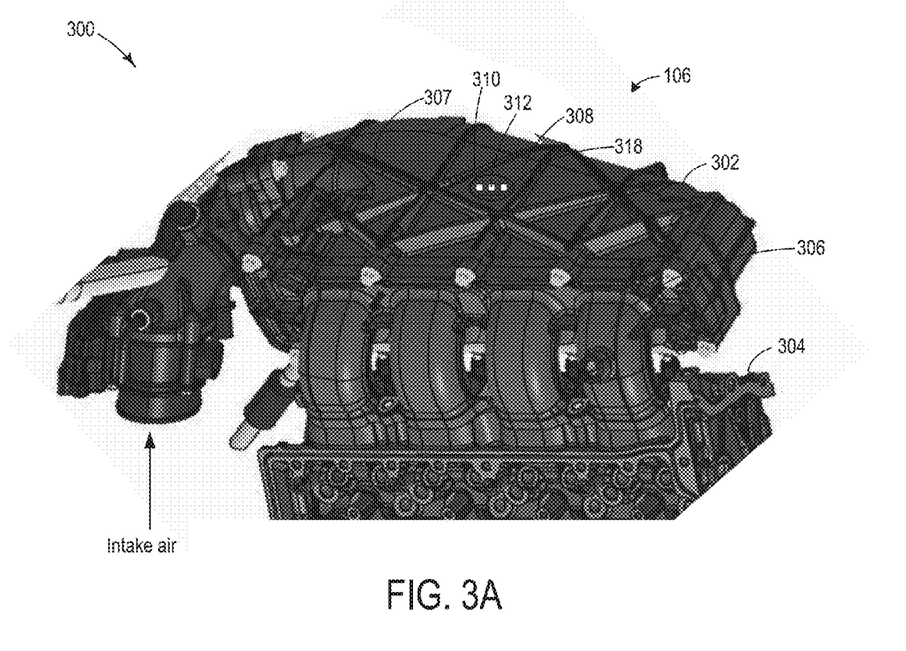
FIGS. 3A-B show example views of a laser pressure transducer system molded into an intake manifold.
Figure 3B:
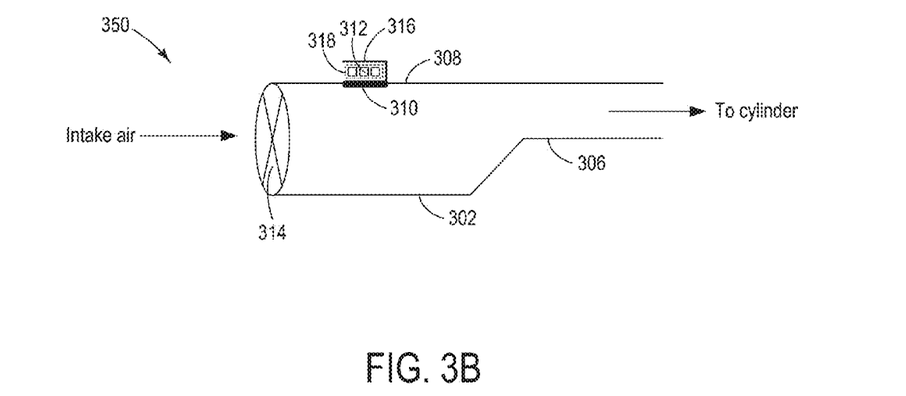
Figure 4:
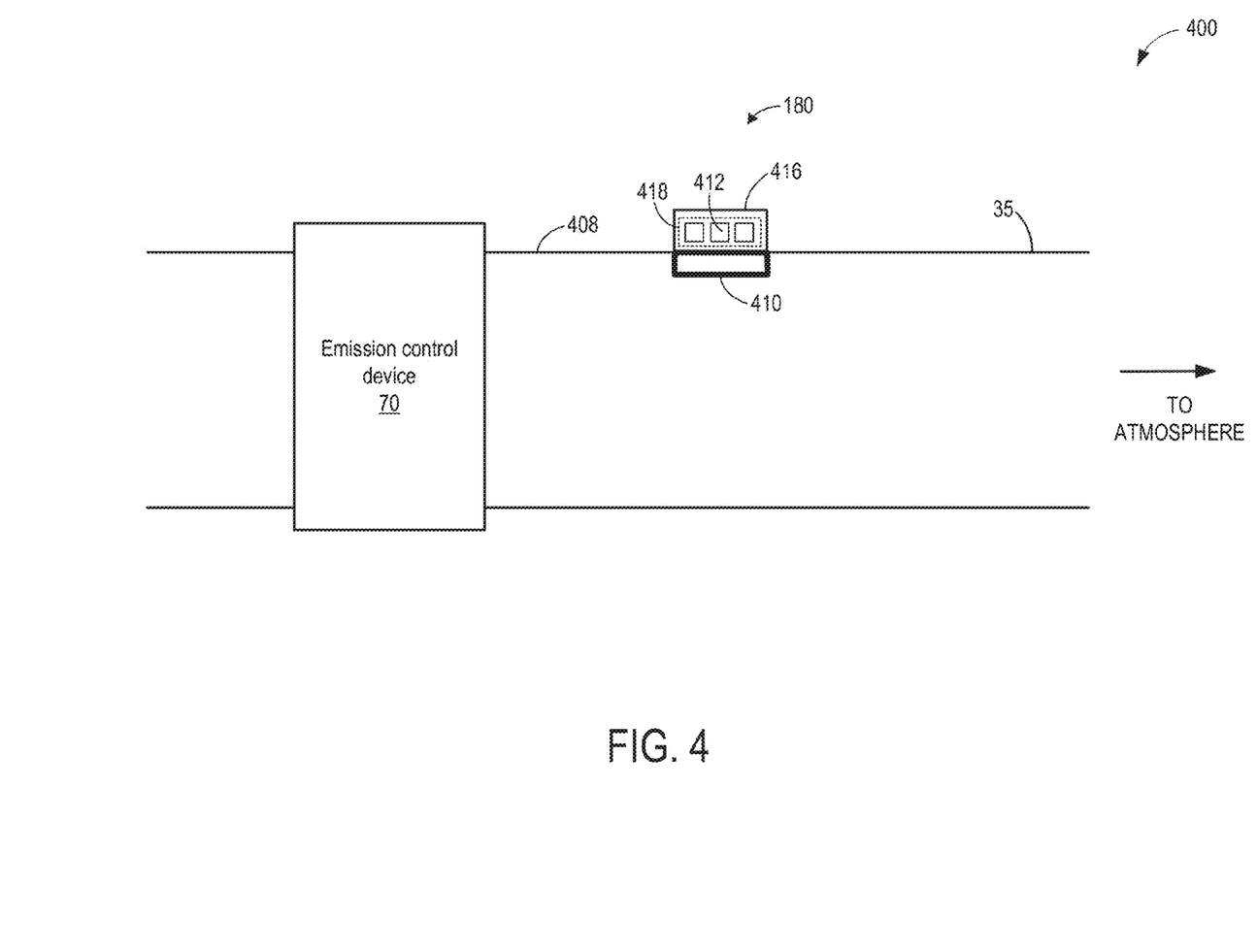
FIG. 4 shows an example laser pressure transducer system mounted on an exhaust manifold.

Turning now to FIGS. 3A-B, example views of a laser pressure transducer system coupled to an intake manifold are shown. Specifically, FIG. 3A shows a top view 300 of the pressure transducer coupled to an intake manifold, while FIG. 3B shows a side view 350.

Top view 300 shows an intake manifold 302 that is connected to cylinder head 304 and is configured to deliver intake aircharge to engine cylinders (not shown) via runners 306. Intake manifold 302 is made of a heat-resistant material, such as fiber glass plastic. Intake manifold may be configured with cross-structures 307 that protrude above the plane of the intake manifold. Cross-structures 307 provide structural rigidity to intake manifold 302. In between cross-structure 307 are flat regions 308.

Intake manifold laser pressure transducer 106 (of FIG. 1) may be molded into intake manifold 302. Specifically, diaphragm 310 may be molded into flat region 308 of intake manifold 302. In other words, one of the flat regions may be the pressure sensitive diaphragm. The central location of the diaphragm allows it to be deflected proportionate to the pressure in the center of manifold, which is translated into electrical output by the laser transducer.

Diaphragm 310 may be made of the same material as the intake manifold, such as fiber glass plastic. Laser circuit components 312 may then be housed on top of the diaphragm. Specifically, laser circuit components 312 may be printed onto a laser circuit card 318 which is housed on top of the diaphragm. The laser circuit components 312 may include a diode laser (for emitting laser pulses), a laser detector (for detecting reflected laser pulses), and a thermal sensor (for receiving infra-red radiation from the inside of the diaphragm).

Side view 350 of FIG. 3B shows diaphragm 310 molded into intake manifold 302 and laser housing 316 molded on top of the diaphragm. Diaphragm 310 is molded into flat region 308 of intake manifold 302 so that manifold pressure of aircharge can be estimated at a location downstream of intake throttle 314 and upstream of runners 306 delivering air to the cylinders. Laser housing may be configured so that laser circuit card 318 can slide into the housing. This reduces the cost and complexity of the laser transducer system.

In one example, the diaphragm 310 has a generally planar surface exposed to the prevailing intake manifold pressure, where the laser circuit components are 312 are positioned on an opposite side of the planar surface exposed to the intake manifold interior volume. The laser circuit components may include a laser aimed perpendicularly at the back side of the surface exposed to the interior volume of the intake manifold. The generally planar surface of diaphragm 310 may be generally aligned with an interior surface of a wall of the intake manifold such that it is flush with the manifold wall so as not to protrude further into the interior cavity of the intake manifold any further than other nearby portions of the intake manifold wall.

Turning now to FIG. 4, an example embodiment 400 of a laser pressure transducer system coupled to an exhaust manifold is shown. Embodiment 400 shows exhaust manifold 408 that is configured to deliver exhaust gases treated upon passage through emission control device 70 to the atmosphere via exhaust passage 35 from downstream. Exhaust manifold 408 is made of a heat-resistant material, such as fiber-glass, plastic, steel or aluminum.

Exhaust manifold laser pressure transducer 108 (of FIG. 1) may be stamped into exhaust manifold 408. More specifically, diaphragm 410 may be stamped into exhaust passage 35. Alternatively, diaphragm 410 may be cast or machined as part of the base structure of the exhaust manifold in a configuration similar to the one described above with reference to the intake manifold laser pressure transducer with a flat region of the exhaust manifold configured to be the pressure sensitive diaphragm. The integrated diaphragm 410 may be made of a heat resistant material, including the same material as the exhaust manifold, such as aluminum or steel (e.g., 304 stainless steel) and/or plastic. Laser circuit components 412 may then be housed on top of the diaphragm. Specifically, laser circuit components 412 may be printed onto a laser circuit card 418 which is housed on top of the diaphragm in a housing 416. The laser circuit components 412 may include a diode laser (for emitting laser pulses), a laser detector (for detecting reflected laser pulses), and a thermal sensor (for receiving infra-red radiation from the inside of the diaphragm). Laser housing may be configured so that laser circuit card 418 can slide into the housing. Alternatively, the circuit card may be stamped into the housing. This reduces the cost and complexity of the laser transducer system.

It will be appreciated that in alternate embodiments, any of the intake and exhaust manifold laser pressure transducer system may include a conventional transducer housing with a plastic or metal diaphragm and a sensor line connecting the laser circuit card components to the diaphragm.

Figure 5:
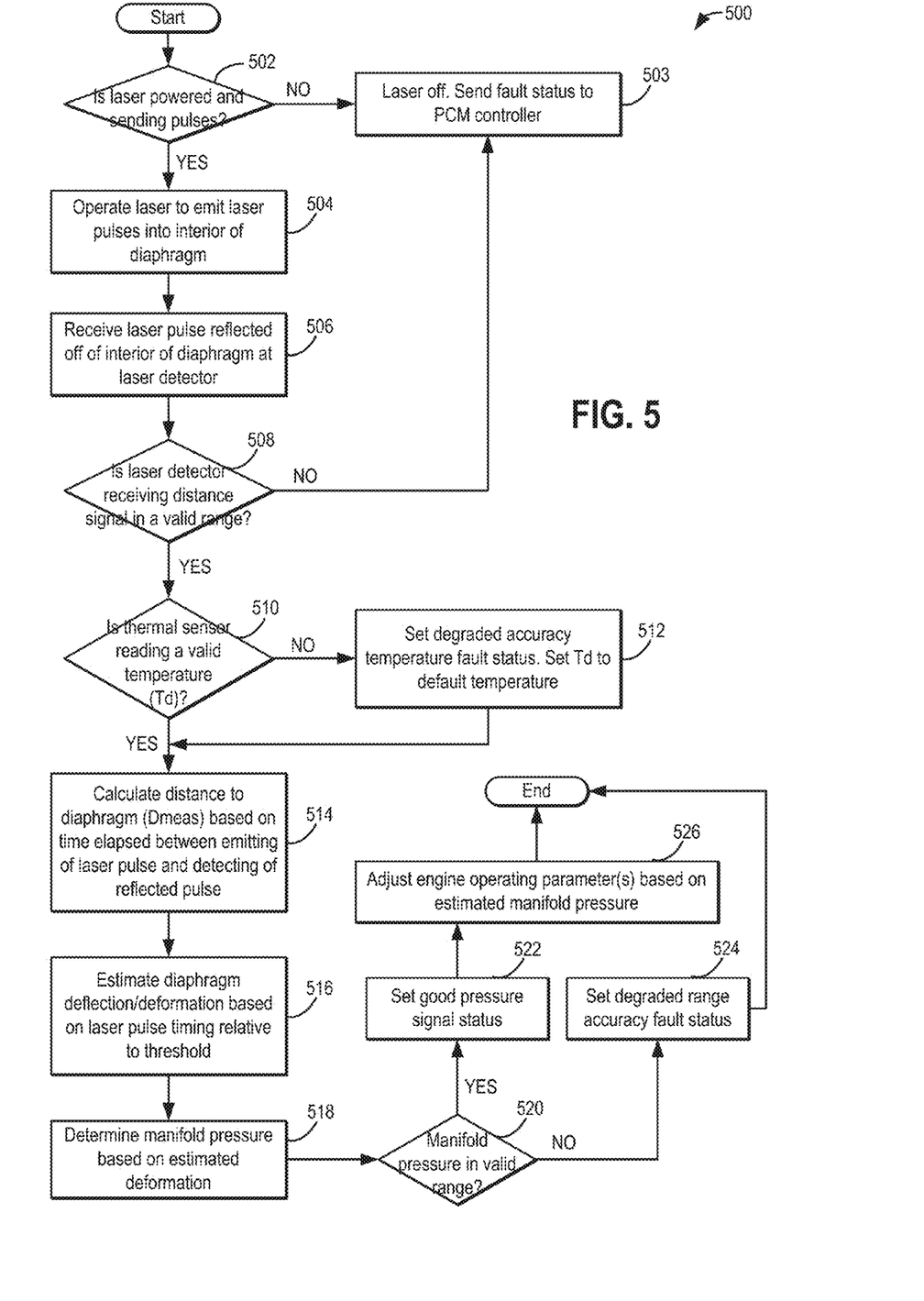
FIG. 5 shows a high level flow chart for adjusting engine operation based on a manifold pressure estimate generated via the laser pressure transducer system.

Turning now to FIG. 5, an example method 500 is shown for operating the laser pressure transducer system to estimate a manifold pressure and adjusting an engine operating parameter based on the estimated manifold pressure. The method enables engine operation to be adjusted responsive to laser pulses received bouncing off a diaphragm in an engine manifold.

At 502, it may be confirmed that the laser of the laser pressure transducer is powered and sending pulses (or capable of sending pulses). If not, at 503, the laser may be powered off. In addition, a fault status may be sent to the PCM controller. For example, a diagnostic code may be set by the engine controller indicating a faulty laser pressure transducer.

If the laser is working, at 504, the method includes operating the laser to emit laser pulses to an interior of the diaphragm. The laser may be mounted or stamped on the top of the diaphragm, and therefore may be configured to direct the emitted laser pulses towards an interior of the diaphragm, and more specifically, to a bottom surface of the diaphragm. For example, the laser pulses may be emitted toward a diaphragm coupled to an engine manifold from a laser mounted on the diaphragm. The laser pulses may be emitted synchronous with engine firing frequency. At 506, the method includes detecting laser pulses reflected off the bottom surface of the diaphragm at the detector mounted or stamped to the top of the diaphragm. Specifically, laser pulses may be received reflecting from an interior of the diaphragm opposite an interior of the manifold at a detector mounted to the diaphragm.

At 508, the method includes confirming that the laser detector is receiving a distance signal in a valid range. As such, the duration elapsed between the emission of the laser pulse and the detection of the reflected pulse correlates with a distance between the top of the diaphragm (where the laser pulse is emitted) and the bottom of the diaphragm (where the laser pulse is reflected). If the distance signal received at the detector is larger than a signal corresponding to the length of the diaphragm, it may be determined that the detector is not receiving a distance signal in a valid range. If the signal is not in the valid range, than the method returns to 503 wherein the laser is powered off and a fault status is indicated.

If the laser detector is receiving a distance signal in a valid range, then at 510, the method includes confirming that the thermal sensor (also mounted to the top of the diaphragm) is reading a valid temperature signal (Td). For example, an expected temperature of the diaphragm may be determined based on engine operating conditions. If the thermal sensor reading is higher or lower than the expected reading by more than a threshold amount, it may be determined that the thermal sensor output is inaccurate. If the thermal sensor reading is invalid, then at 512, the method includes setting a diagnostic code to indicate that the thermal sensor is degraded. For example, a degraded accuracy temperature fault status may be set. In addition, the diaphragm temperature may be set to be a default temperature (e.g., 60° F.).

Next, at 514, the method includes calculating a distance to the diaphragm (Dmeas) based on the time elapsed between the emitting of the laser pulse and the detecting of the laser pulse. For example, the distance may be determined by frequency modulation methods using frequency-modulated laser beams with a repetitive linear frequency ramp.

At 516, the method includes estimating an amount of diaphragm deformation (or deflection) based on the laser pulse timing relative to a threshold. As such, the diaphragm may be molded into the manifold (or stamped or cast into the manifold). Consequently, based on an amount of pressure experienced by the diaphragm in the engine manifold (which may be an intake or an exhaust manifold), the deformation of the diaphragm may vary. Specifically, as the manifold pressure increases, the deformation of the diaphragm may increase, and correspondingly the distance to the diaphragm (as well as the time elapsed between emission of the laser pulse and detection of the reflected pulse) may decrease. In one example, the estimated time difference between the emission of the laser pulse and detection of the laser pulse may be compared to a time difference estimated during a calibration condition when the diaphragm is not deformed, such as when the engine is not operating. Alternatively, a distance to the diaphragm estimated during engine operating conditions may be compared to a threshold distance to the diaphragm estimated during calibration conditions when the diaphragm is not deformed. As the estimated time difference decreases from the threshold, an estimated deformation of the diaphragm due to manifold pressure may also increase. Likewise, as the estimated distance to diaphragm decreases, the deformation of the diaphragm due to manifold pressure may increase.

At 518, the manifold pressure may be estimated based on the deformation of the diaphragm. The manifold pressure estimate may be further adjusted based on the estimated temperature of the diaphragm (Td). For example, at a given temperature, as the deformation of the diaphragm increases, an estimate of the manifold pressure applied on the diaphragm may correspondingly increase. The controller may refer to a look-up table stored as a function of distance to diaphragm (or laser timing) and diaphragm temperature to determine the corresponding manifold pressure (MAP).

At 520, it may be determined if the manifold pressure is in a valid range. For example, an expected manifold pressure may be determined based on engine operating conditions. If the estimated manifold pressure is higher or lower than the expected pressure by more than a threshold amount, it may be determined that the pressure signal is invalid. If the pressure signal is determined to be invalid, at 524, the method includes setting a degraded range accuracy fault status (e.g., by setting a diagnostic code). In addition, the estimated (invalid) pressure may be stored in the controller's memory but not used for adjusting engine operating parameters.

If the pressure signal is determined to be valid, at 522, the method includes setting a valid pressure status. In addition, the estimated (valid) pressure may be stored in the controller's memory. At 526, one or more engine operating parameters may be adjusted based on the estimated manifold pressure. For example, the adjusting may include one or more of adjusting an intake throttle opening, adjusting boost level, adjusting an amount of exhaust gas recirculation, and adjusting an exhaust catalyst temperature responsive to the estimated manifold pressure.

In still further embodiments, exhaust manifold pressure estimated by a laser pressure transducer coupled to the exhaust manifold may be used in concert with engine ignition and position timing data to diagnose fuel injectors for an engine system having individual particulate filters (e.g., gasoline particulate filters, or GPFs) set in individual exhaust runners. An example of such an engine system is provided with reference to FIG. 6. An example method for indicating one or more of engine misfire and fuel injector degradation responsive to laser pulses received bouncing off a diaphragm in an engine manifold is shown with reference to FIG. 7.

Figure 6:
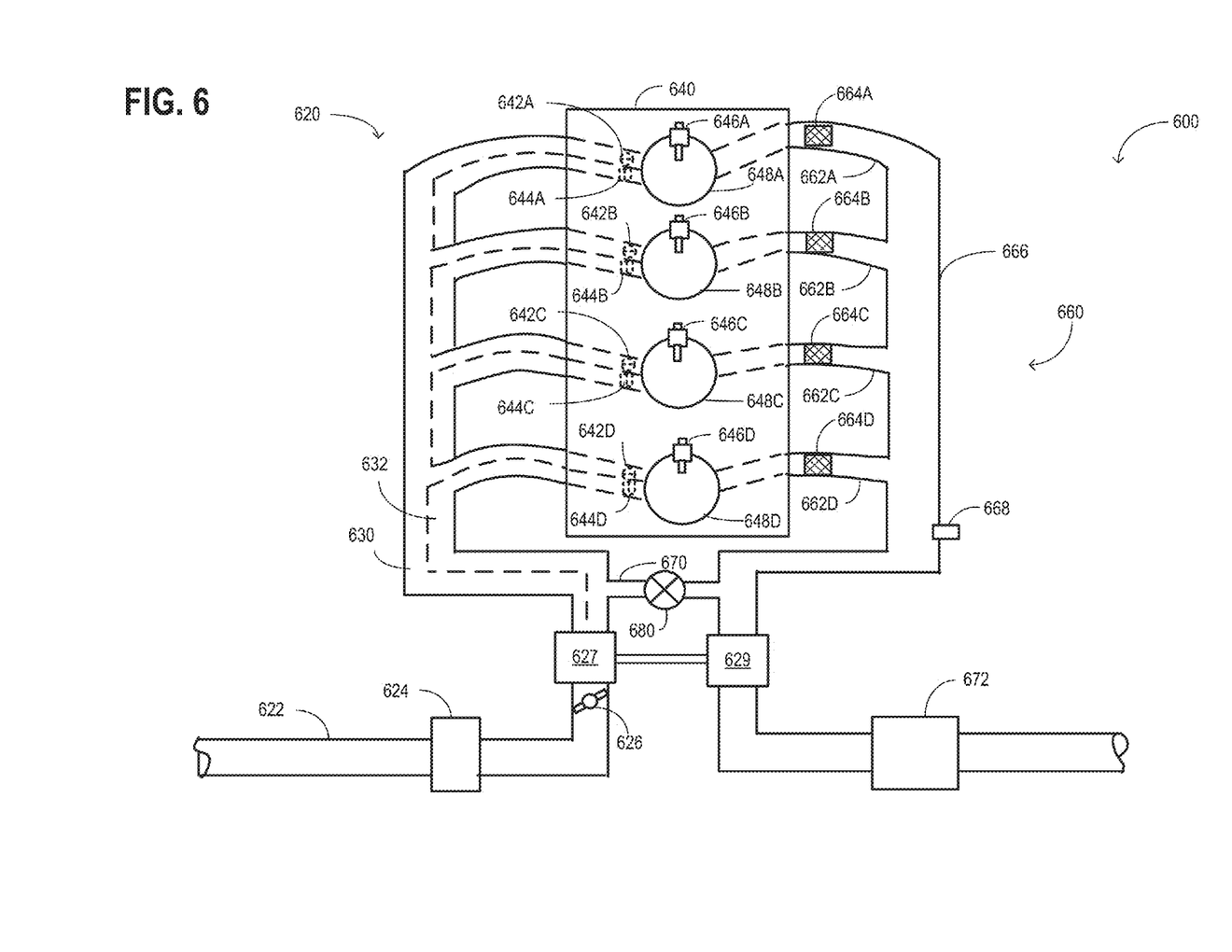
FIG. 6 shows an example embodiment of an engine system having individual particulate filters set in individual exhaust runners.

FIG. 6 illustrates a schematic of an example of an internal combustion engine 600 with individual particulate filters 664A-D in exhaust runners 662A-D of cylinders 648A-D of the engine 600. The present configuration of the engine 600 is shown with four cylinders. However, an engine with a different configuration (e.g., with more or fewer cylinders) may be used. Furthermore, engine 600 may be an example of engine system 8 of FIG. 1 in some embodiments.

As shown in FIG. 6, the engine 600 includes an engine intake manifold 620 with an air intake passageway 622 leading to an air filter 624. A gas flow control device (e.g., an intake throttle 626) may be placed downstream of the air filter 624 to regulate the flow rate of air to an engine block 640. As an example, the intake throttle 626 may be an open throttle during a tip-in and may be a closed throttle during a tip-out. Intake air may flow past throttle 626 and into a compressor 627 of a turbocharger. Compressed intake air may flow through an engine intake pathway 630 to engine cylinder air intake valves 642A-D. As an example, the engine cylinder air intake valves 642A-D may adjust gas flow to engine cylinders 648A-D based on an engine speed, engine load, and/or AFR.

Exhaust gas recirculation (EGR) may flow from an EGR conduit 670, through an EGR intake control valve 680, into an engine EGR intake pathway 632, and to engine cylinder EGR intake valves 644A-D. As seen in the current embodiment, the engine air intake pathway 630 is separate from the engine EGR intake pathway 632 and the two gases are not permitted to mix prior to reaching their respective engine cylinder valves. However, in other embodiments, the two gases may mix and flow into a single pathway leading to one control valve regulating an amount of gas intake into an engine cylinder. Although a high pressure (HP) EGR system is shown (e.g., where exhaust gas flows from upstream of turbine 629 of the turbocharger to an intake pathway downstream of compressor 627 via EGR conduit 670), it is to be understood that additional or alternative EGR configurations may be included in engine 600. For example, an LP EGR system (e.g., where exhaust flows from downstream turbine 629 to an intake pathway upstream of compressor 627) may be included in engine 600 in some examples.

The engine cylinders 648A-D, located in an engine block 640, receive fuel from fuel injectors 646A-D, respectively. Exhaust runners 662A-D are coupled to engine cylinders 648A-D, respectively, at a first end and combine to form an exhaust manifold pathway 666 as part of the exhaust manifold 660 at a second end. Exhaust from the exhaust manifold 660 selectively flows through EGR conduit 670 and/or turbine 629. Exhaust that flows through turbine 629 is then provided to one or more exhaust aftertreatment devices, such as three way catalyst (TWC) 672. In typical exhaust systems, a single, large particulate filter may be placed downstream of a TWC. As shown in FIG. 2, each of the individual particulate filters 664A-D may be placed in a different one of the exhaust runners 662A-D of the engine cylinders 648A-D. Therefore, exhaust flowing from a first cylinder only flows through a first particulate filter (e.g., exhaust from cylinder 648A only flows through particulate filter 664A). In other words, a particulate filter only receives exhaust from an individual cylinder (e.g., particulate filter 664A receives exhaust from only cylinder 648A). In this way, the plurality of individual particulate filters, which may be smaller than particulate filters included in typical exhaust systems, may be included in the engine 600 instead of the single, large particulate filter that is typically present downstream of the TWC in other vehicles. It is to be understood that the individual particulate filters may be included in engine 600 in addition to a single, large particulate filter downstream of the TWC in other examples. The particulate filters 664A-D may comprise suitable material for trapping and/or removing particulates from exhaust gas passing through the filters.

A single laser exhaust pressure transducer 668 may be positioned downstream of each of the exhaust runners and upstream of the turbine 629. However, it is to be understood that other arrangements of aftertreatment devices, turbines, and exhaust pressure sensors may be included in other examples of engine 600. For example, individual laser pressure transducers may be positioned in each exhaust runner 662A-D upstream of the TWC 672 and the turbine 629 and within the exhaust manifold 660, downstream of each particulate filter (e.g., 664A-D). The exhaust from the exhaust runners of the cylinders, merges in the exhaust manifold 660. The exhaust gas from each exhaust runner may flow to either the EGR conduit 670 or to the TWC 672. EGR conduit 670 flows exhaust gas towards the EGR intake control valve 680. The TWC 672 transforms harmful exhaust compounds into safer compounds before the exhaust is released to the atmosphere.

In this configuration, exhaust laser pressure transducer 668 may measure a pressure of exhaust gas in the exhaust manifold 660. The pressure sensor 668 may determine the pressure of exhaust gas originating from an individual engine cylinder (e.g., exhaust gas flowing from the cylinder through the associated exhaust runner to the exhaust manifold) based on a firing time. The firing time may be correlated to an individual cylinder ignition event in order to associate pressure measurements to the individual cylinder ignition event. The frequency at which the pressure sensor signal is sampled may be a selected frequency, and may be timed to correspond to individual cylinder ignition events. In one example, the pressure sensor signal may be sampled every time the controller receives a profile ignition pickup (PIP) signal. The PIP signal may be sent from a crankshaft sensor, such as Hall effect sensor 120 of FIG. 1, each time a tooth (or missing tooth) of a wheel coupled to the crankshaft passes by the Hall effect sensor. As crankshaft position is correlated with each individual cylinder ignition event, the position may be utilized to determine which individual cylinder ignition event corresponds to the pressure sensor signal measurement in the sample acquired at that crankshaft position.

The individual cylinder exhaust gas pressure measurement provides information to diagnose fuel injectors 646A-D, such as misfire events (as elaborated at FIG. 7), as well as high particulate matter load in the particulate filters 664A-D. Further still, the exhaust pressure measurement may be used to diagnose air-fuel cylinder imbalances during switching events. As one example, if the pressure sensor 668 determines that the exhaust gas pressure amplitude for an individual cylinder is higher than an expected exhaust pressure before an ignition event for the cylinder, then it may be determined that the cylinder has misfired. As another example, if the pressure sensor 668 measures the exhaust gas pressure amplitude for an individual cylinder as being below an expected exhaust pressure amplitude and/or an average exhaust pressure amplitude, then the particulate matter load of the individual particulate filter for that cylinder may be determined to be higher than an expected and/or acceptable particulate matter load. Thus, based on the measurement from the pressure sensor 668, a controller may command regeneration of the individual particulate filter responsive to diagnosing high particulate load on that particulate filter.

In the above-described example, the expected exhaust pressure may be based on engine operating conditions, such as engine speed and firing order, spark timing, or a predetermined value determined as a function of engine parameters such as air mass. Likewise, the average exhaust pressure may be an average measurement of exhaust pressure amplitudes associated with each cylinder over a period of time (e.g., a selected number of engine cycles).

As another example, in response to a measurement of exhaust gas pressure amplitude for a cylinder being below a threshold, it may be indicated that a fuel injector associated with the cylinder (e.g., the fuel injector that injects fuel into that cylinder) is degraded. In response to such a determination of a degraded fuel injector, an engine adjustment may be commanded in order to address the effects of the degraded fuel injector (e.g., the increased particulate load on the particulate filter resulting from increased particulate matter output from the degraded fuel injector). In some embodiments, the engine adjustment may include retarding the spark timing to increase the cylinder temperature to regenerate the particulate filter and/or clean the fuel injector of fouling.

Figure 7:
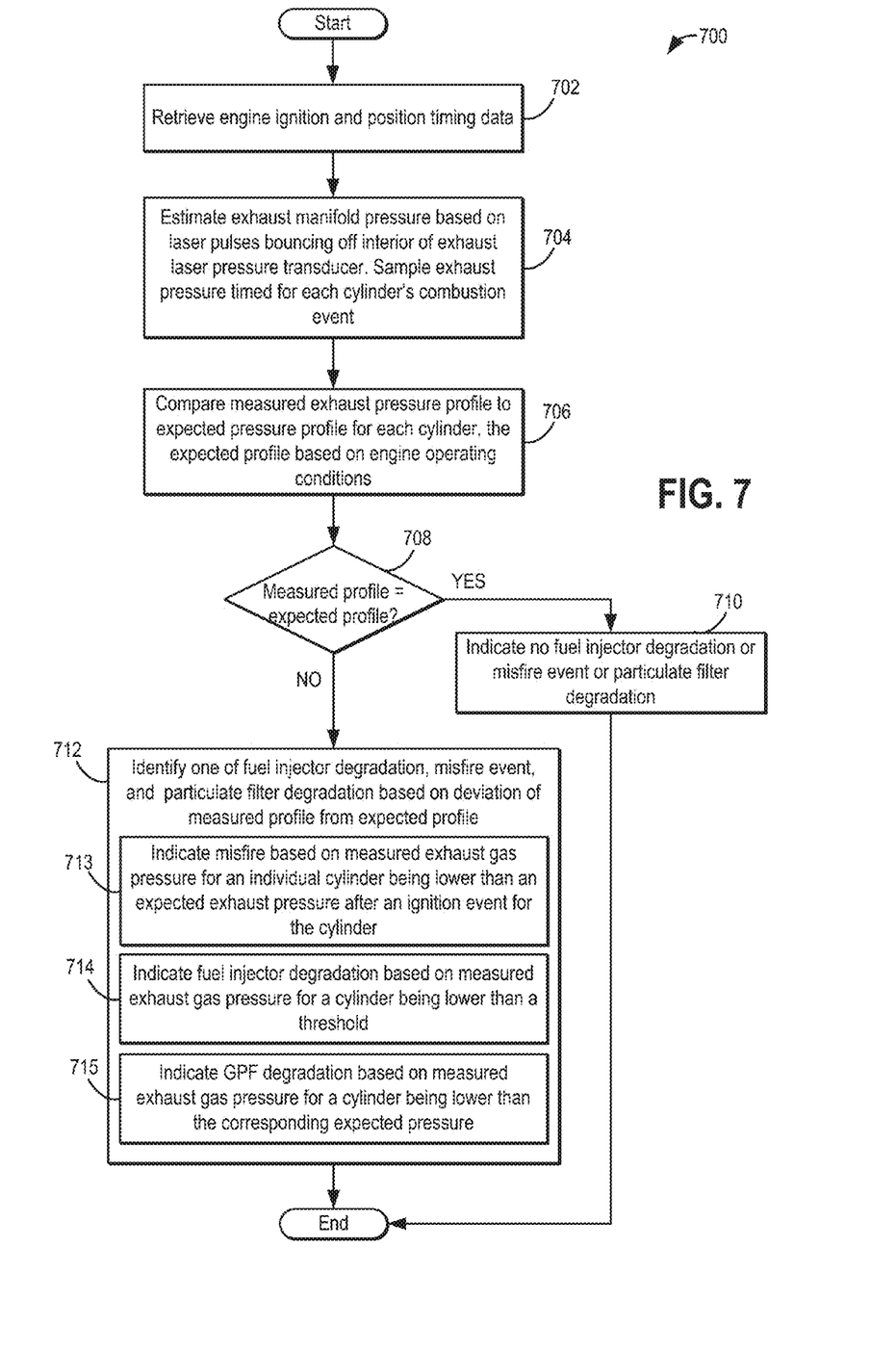
FIG. 7 shows a high level flow chart for identifying degradation of an engine component in the engine system of FIG. 6 based on manifold pressure estimated by an exhaust laser pressure transducer.

Now turning to FIG. 7, an example method 700 for identifying at least one of degradation of a fuel injector, degradation of an individual runner particulate filter, and a misfire event based on exhaust manifold pressure estimated by an exhaust laser pressure transducer is provided. While the method is depicted with reference to the engine system of FIG. 6, it will be appreciated that the method may be similarly applied for other engine system configurations.

At 702, the method includes retrieving engine ignition and position timing data. This includes retrieving data pertaining to the timing of ignition events in each engine cylinder as well as the position of a piston in each cylinder. In other words, it may be determined which stroke each cylinder is in, and further if an ignition event has occurred or not in a given engine cylinder.

At 704, the method includes estimating an exhaust manifold pressure based on laser pulses bouncing off an interior of a diaphragm of an exhaust laser pressure transducer (such as transducer 108 of FIG. 1 or sensor 668 of FIG. 6). As elaborated with reference to FIG. 5, measuring the exhaust manifold pressure may include emitting a laser pulse from the diode laser mounted on the diaphragm into an interior of the diaphragm, and then detecting a laser pulse reflected off the interior of the diaphragm at a detector also mounted on the diaphragm. A distance from the laser to the diaphragm is then estimated based on a time elapsed between the emitting of the laser pulse and the detection of the reflected pulse. The distance is compared to a threshold to determine the amount of deflection or deformation of the diaphragm incurred due to manifold pressure applying a force on the diaphragm. A manifold pressure estimate is then calculated based on the distance (or deflection). The manifold pressure estimate is further based on a temperature of the diaphragm as estimated by a thermal sensor mounted on the diaphragm, the thermal sensor receiving infra-red radiation from into an interior of the diaphragm.

Measuring the exhaust pressure may include taking a sample of the exhaust pressure measurement that is timed for each cylinder. In one example, the same may be timed for each cylinder's exhaust stroke. Thus, each sample may include one or more pressure pulses associated with exhaust output from a given cylinder. As such, the exhaust pressure measurements estimated via the laser pressure transducer may be continuously acquired (e.g., such that an uninterrupted signal is output from the exhaust pressure sensor during operation, the sample being a selected portion of the signal output from the sensor) or may only be acquired during the sampling time. The exhaust pressure profile (e.g., the amplitudes of pressure pulses in an exhaust pressure amplitude measurement sample) may be associated to an individual cylinder based on comparing the sample time and/or the time at which the pressure pulses occurred relative to a firing time for each cylinder. As the exhaust pressure pulses (e.g., the peaks in an exhaust pressure sensor signal) may occur as a result of exhaust entering the exhaust manifold from an individual cylinder during that cylinder's exhaust stroke, an exhaust pressure measurement taken at a selected time may be associated with the individual cylinder that caused the exhaust pressure pulse at that time.

At 706, the method includes comparing the generated/estimated exhaust pressure profile to an expected pressure profile, which includes profiles of exhaust pressure peaks for each cylinder. The expected profile may be based on engine operating conditions including the firing order or each cylinder. In alternate examples, the estimated exhaust pressure profile (e.g., the amplitude of exhaust pressure peaks) may be compared to a threshold. The threshold may be based on an expected exhaust pressure amplitude and may include a guard band (e.g., a range of exhaust pressure values, the highest exhaust pressure value being the uppermost edge of the guard band, and the lowest exhaust pressure value being the lowermost edge of the guard band).

At 708, it may be determined if the measured exhaust pressure profile is equal to (or within a threshold distance of) the expected exhaust pressure profile. If yes, then at 710, the method includes indicating that there is no degradation of the fuel injectors, or particulate filters (coupled in the runners). In addition, no misfire may be indicated.

If there is a deviation between the measured profile and the expected profile, then at 712, based on the deviation of the measured profile from the expected profile, the controller may identify one or more of fuel injector degradation, particulate filter degradation, and a misfire event. For example, at 713, the controller may indicate a misfire event based on the measured exhaust gas pressure for an individual cylinder being much lower than an expected exhaust gas pressure (e.g., lower than the expected exhaust gas pressure by more than a threshold difference) for the given cylinder following an ignition (or spark) event for the given cylinder. In this way, when the manifold pressure estimated by the laser pressure transducer is an exhaust pressure, a controller may indicate a cylinder misfire event based on the estimated manifold pressure and further based on a cylinder spark timing.

As another example, at 714, the controller may indicate fuel injector degradation based on the measured exhaust gas pressure for a given cylinder being lower than a threshold due to reduced delivery of fuel in the cylinder. In this way, when the manifold pressure estimated by the laser pressure transducer is an exhaust pressure, a controller may indicate degradation of a cylinder fuel injector based on the estimated manifold pressure relative to an engine ignition timing.

As yet another example, at 715, the controller may indicate particulate filter degradation based on the measured exhaust gas pressure for a given cylinder being lower than the corresponding expected exhaust gas pressure.

In this way, degradation of one or more engine components may be identified (including the identity of a cylinder where the component is degraded) based on a manifold pressure estimated by a laser pressure transducer, and further based on an amplitude of the estimated manifold pressure relative to cylinder piston positions (indicating which stroke the cylinder is in) as well an cylinder ignition timing (indicating when a cylinder spark event occurs).

For example, a controller may be configured to perform a method for an engine, comprising: emitting laser pulses into a diaphragm coupled to an engine manifold from a laser mounted on the diaphragm; receiving laser pulses upon reflection off an interior of the diaphragm at a detector mounted to the diaphragm; estimating a distance to the diaphragm based a duration elapsed between the emitting and the receiving; and adjusting engine operation based on the estimated distance. The method may further comprise receiving infra-red radiation from the interior of the diaphragm at a thermal sensor mounted to the diaphragm, and estimating a temperature of the diaphragm based on the received infra-red radiation. Herein, the adjusting includes estimating a manifold pressure based on the estimated distance and further based on the estimated temperature of the diaphragm, and adjusting engine operation based on the estimated manifold pressure, the estimated manifold pressure increased as the estimated distance to the diaphragm increases at a given temperature. Each of the laser, detector, and thermal sensor are mounted to the top of the diaphragm, and the emitted laser pulses are emitted from the top of the diaphragm into the interior of the diaphragm while the reflected pulses are reflected off a bottom of the diaphragm to the detector at the top of the diaphragm. The distance to the diaphragm may include a distance from the laser to the bottom of the diaphragm. The method may further comprise indicating a cylinder misfire event based on the estimated manifold pressure and further based on a cylinder spark timing.

In another example, a vehicle system comprises an engine including an exhaust manifold; a diaphragm cast into the exhaust manifold wherein a top of the diaphragm is coupled to the exhaust manifold and a bottom of the diaphragm is positioned in an exhaust passage of the exhaust manifold; a diode laser and a laser detector mounted to the top of the diaphragm; a thermal sensor mounted to the top of the diaphragm for sensing infra-red radiation within the diaphragm; and a controller. The controller may be configured with computer readable instructions stored on non-transitory memory for operating the laser to emit laser pulses to an interior of the diaphragm; detecting laser pulses reflected off the bottom of the diaphragm at the detector; and based on a duration elapsed between a laser pulse being emitted and a reflected pulse being detected, estimating a manifold pressure. Further, the controller may be configured to adjust an engine operating parameter based on the estimated manifold pressure. The engine may further include an intake throttle and a turbocharger, such that the adjusting includes increasing an opening of the intake throttle and/or increasing an output of the turbocharger as the estimated manifold pressure drops below a threshold. The duration elapsed between the laser pulse being emitted and the reflected pulse being detected may be a first duration estimated during an engine running condition, and the controller may include further instructions for comparing the first duration to a threshold, the threshold based on a second duration elapsed between the laser pulse being emitted and the reflected pulse being detected during an engine calibration condition, the diaphragm being completely not deformed during the engine calibration condition. In other words, the second duration is used as a reference. The controller may include still further instructions for estimating a temperature of the diaphragm based on an output of the thermal sensor, the estimated manifold pressure is adjusted based on the output of the thermal sensor.

It will be appreciated that while the laser pressure transducer discussed above is depicted to be an engine (intake or exhaust) manifold pressure transducer, this is not meant to be limiting, and the laser pressure transducer may be similarly used in alternate locations for pressure sensing. For example, in one alternate representation, the laser pressure transducer may be coupled to an engine cylinder for estimating an in-cylinder pressure. Therein, a steel liner may include a diaphragm area above a piston travel zone. The laser circuit housing may then be mounted on the back side of the piston travel zone. A controller may adjust engine operation responsive to laser pulses received bouncing off a diaphragm coupled to (e.g., within) the cylinder. The diaphragm may be cast or stamped inside the cylinder above a piston travel zone. As an example, an engine controller may be configured to emit laser pulses into a diaphragm coupled to an inside of an engine cylinder from a laser mounted on the diaphragm; receive laser pulses upon reflection off an interior of the diaphragm at a detector mounted to the diaphragm; estimate a deformation of the diaphragm based a duration elapsed between the emitting and the receiving; and estimate an in-cylinder pressure based on the estimated deformation. In another representation, a controller may operate a laser mounted on a laser pressure transducer, the transducer having a diaphragm coupled to a combustion chamber, to estimate a distance from the laser to a bottom surface of the diaphragm. The laser may emit a laser pulse into the interior (e.g., bottom) of the diaphragm. A laser detector may also be coupled to the diaphragm and may be configured to detect a reflection of the emitted laser pulse following reflection off the interior of the diaphragm. Based on a time elapsed between the emission of the laser pulse and the detection of the laser pulse, a distance from the laser to the diaphragm bottom surface may be estimated. An in-cylinder pressure may then be determined based on the estimated distance. The in-cylinder pressure may be further adjusted based on an in-cylinder temperature estimate. A thermal sensor may also be coupled to the diaphragm and may be configured to detect infra-red radiation received from the interior of the diaphragm. An engine controller may estimate the in-cylinder pressure based on each of the estimated distance and the estimated in-cylinder temperature (e.g., by referring to a look-up table). One or more engine operating parameters, such as engine fueling (fueling amount or timing), spark timing, intake throttle opening, and boost pressure may then be adjusted based on the determined in-cylinder pressure.

It will be appreciated that in still further representations, the laser pressure transducer discussed above may be used for the remote measurement of pressure from a distance using the laser and thermal sensors on a controlled region of a pressure vessel. As such, this may be advantageously used to measure extremely hot or cold cylinders, such as at an atomic reactor. The remote sensing (including through a window) may allow for measuring pressure in areas where direct contact is not feasible or practical, such as on the exterior of a hypersonic vehicle, or in a severe EMC environment.

To enable the remote pressure measurement using a laser pressure transducer, the transducer system may include a laser, a detector, and an IR sensor to view a diaphragm remotely from the outside of a pressure vessel. For fixed distance and fixed relative location, the laser set-up may be the same as discussed above with reference to the manifold pressure transducer. Therein, the diaphragm deflection may be mapped to a pressure of the pressure vessel. For relative movement with a plain, such as for a moving location of the body with the diaphragm relative to the laser/detector, the laser may illuminate targets on the right and left edges of the diaphragm on the plain of movement, and then their distance may be measured. This may require two additional lasers. The average of the two targets' distances may be used to establish a "zero-pressure" deflection of the diaphragm. Diaphragm deflection may then be determined as the measured diaphragm distance minus the "zero pressure" deflection distance. Deflection is then mapped to pressure.

For relative movement in 3-dimensional space, such as for a moving location of the body with the diaphragm relative to the laser/detector, targets may be set on the right, left, top and bottom edges of the diaphragm, the selected targets may be illuminated by the laser, and their distances may be measured. This may require up to four additional lasers. The average of the four targets' distances may be used to establish the "zero-pressure" deflection of the diaphragm. Diaphragm deflection may then be determined as the measured diaphragm distance minus the "zero pressure" deflection distance. Deflection is then mapped to pressure.

In this way, manifold pressure may be estimated accurately and cost-effectively by relying on a laser pressure transducer having a pressure sensitive diaphragm. By using a laser to correlate the deflection of a diaphragm coupled to an engine manifold with the manifold pressure, the reliability of manifold pressure estimation is increased. By coupling the laser emitter and detector to the sealed interior cavity of the diaphragm, the sensor circuitry is guarded from In this way, a more cost-effective manifold pressure transducer/sensor may be provided without compromising the accuracy or reliability of the sensor. By using lasers, detectors, and thermal sensors that are coupled to a sealed diaphragm, exposure of the sensor circuitry to corrosive liquids and high temperatures is reduced. As such, this improves the durability and life of the pressure sensor, while also reducing engine warranty issues associated with a degraded pressure sensor. By using a more reliable and durable manifold pressure sensor for engine control, fuel economy and engine performance can be improved.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, I-3, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
adjusting engine operation responsive to laser pulses received bouncing off a diaphragm in an engine manifold, including estimating deflection of the diaphragm based on the laser pulses, estimating manifold pressure based on the deflection, and adjusting engine operation responsive to the estimated manifold pressure.

2. The method of claim 1, wherein the engine manifold is one of an intake manifold and an exhaust manifold.

3. The method of claim 2, wherein the diaphragm is molded into the intake manifold.

4. The method of claim 2, wherein the diaphragm is stamped into an exhaust passage of the exhaust manifold.

5. The method of claim 1, wherein the laser pulses are emitted into an interior of the diaphragm by a laser, and wherein the laser pulses are received at a detector upon reflection off the interior of the diaphragm, each of the laser and detector mounted to the diaphragm, and wherein the laser pulses are emitted synchronous with engine firing frequency.

6. The method of claim 5, further comprising estimating a temperature of the diaphragm responsive to infra-red radiation received from the interior of the diaphragm, the infra-red radiation received at an infra-red sensor coupled to the laser and mounted to the diaphragm.

7. The method of claim 1, wherein estimating deflection of the diaphragm based on the laser pulses includes comparing a time difference between emission of a laser pulse by the laser and detection of a reflected laser pulse by the detector to a time threshold, and estimating the deflection based on the comparison.

8. The method of claim 7, wherein the time threshold is based on a time difference between emission of a laser pulse by the laser and detection of a reflected laser pulse by the detector during a calibration condition when the diaphragm is not deflected.

9. The method of claim 8, wherein adjusting engine operation includes one or more of adjusting an intake throttle opening, adjusting a boost level, adjusting fuel flow, adjusting an amount of exhaust gas recirculation, adjusting spark timing, adjusting purge flow, adjusting RPM, and adjusting an exhaust catalyst temperature responsive to the estimated manifold pressure.

10. The method of claim 1, wherein the manifold pressure is an exhaust pressure, the method further comprising indicating degradation of a cylinder fuel injector based on the estimated manifold pressure relative to an engine ignition timing.

11. A method for an engine, comprising:
emitting laser pulses toward a diaphragm coupled to an engine manifold from a laser mounted on the diaphragm;
receiving laser pulses reflecting from an interior of the diaphragm opposite an interior of the manifold at a detector mounted to the diaphragm;
adjusting engine operation based on a duration elapsed between the emitting and the receiving; and
indicating a cylinder misfire event based on an estimated manifold pressure and further based on a cylinder spark timing.

12. The method of claim 11, further comprising estimating a distance to the diaphragm based on a duration elapsed between the emitting and the receiving, receiving infra-red radiation from the interior of the diaphragm at a thermal sensor mounted to the diaphragm, and estimating a temperature of the diaphragm based on the received infra-red radiation.

13. The method of claim 12, wherein the adjusting includes estimating the manifold pressure based on the estimated distance and further based on the estimated temperature of the diaphragm, and adjusting engine operation based on the estimated manifold pressure, the estimated manifold pressure increased as the estimated distance to the diaphragm increases at a given temperature.

14. The method of claim 12, wherein each of the laser, detector, and thermal sensor is mounted to a top of the diaphragm, wherein the emitted laser pulses are emitted from the top of the diaphragm into the interior of the diaphragm and the reflected pulses are reflected off a bottom of the diaphragm to the detector at the top of the diaphragm, and wherein the distance to the diaphragm includes a distance from the laser to the bottom of the diaphragm.

15. A vehicle system, comprising:
an engine including an exhaust manifold;

a diaphragm cast into exhaust manifold wherein a top of the diaphragm is coupled to the exhaust manifold and a bottom of the diaphragm is positioned in an exhaust passage of the exhaust manifold;

a diode laser and a laser detector coupled to the top of the diaphragm;

a thermal sensor mounted to the top of the diaphragm for sensing infra-red radiation within the diaphragm; and a controller with computer readable instructions for:
  operating the laser to emit laser pulses to an interior of the diaphragm;
  detecting laser pulses reflected off the bottom of the diaphragm at the detector;
  based on a duration elapsed between a laser pulse being emitted and a reflected pulse being detected, estimating a manifold pressure; and
  adjusting an engine operating parameter based on the estimated manifold pressure.

16. The system of claim 15, wherein the engine further includes an intake throttle and a turbocharger, and wherein the adjusting includes increasing an opening of the intake throttle and/or increasing an output of the turbocharger as the estimated manifold pressure drops below a threshold.

17. The system of claim 15, wherein the duration elapsed between the laser pulse being emitted and the reflected pulse being detected is a first duration estimated during an engine running condition, and wherein the controller includes further instructions for comparing the first duration to a threshold, the threshold based on a second duration elapsed between the laser pulse being emitted and the reflected pulse being detected during an engine calibration condition, the diaphragm being completely not deformed during the engine calibration condition.

18. The system of claim 17, wherein the controller includes further instructions for estimating a temperature of the diaphragm based on an output of the thermal sensor, and wherein the estimated manifold pressure is adjusted based on the output of the thermal sensor.

* * * * *